United States Patent
Strosaker (10) Patent No.: US 10,241,892 B2
(45) Date of Patent: Mar. 26, 2019

(54) ISSUANCE OF STATIC ANALYSIS COMPLAINTS

(71) Applicant: INTERNATIONAL BUSINESS MACHINES CORPORATION, Armonk, NY (US)

(72) Inventor: Michael T. Strosaker, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 125 days.

(21) Appl. No.: 15/367,224

(22) Filed: Dec. 2, 2016

(65) Prior Publication Data

US 2018/0157578 A1     Jun. 7, 2018

(51) Int. Cl.
*G06F 9/44* (2018.01)
*G06F 11/36* (2006.01)
*G06F 17/30* (2006.01)

(52) U.S. Cl.
CPC .... *G06F 11/3612* (2013.01); *G06F 17/30312* (2013.01)

(58) Field of Classification Search
None
See application file for complete search history.

(56) References Cited

U.S. PATENT DOCUMENTS

| 7,120,902 | B2 * | 10/2006 | Flanagan | G06F 9/44589 717/130 |
| 8,479,169 | B1 * | 7/2013 | Evans | G06F 11/3604 717/131 |
| 8,745,578 | B2 * | 6/2014 | Pistoia | G06F 8/43 717/104 |
| 8,966,453 | B1 * | 2/2015 | Zamfir | G06F 11/3604 714/38.1 |
| 9,690,690 | B1 * | 6/2017 | Henriksen | G06F 11/3692 |
| 2002/0133806 | A1 * | 9/2002 | Flanagan | G06F 9/44589 717/123 |
| 2006/0190770 | A1 * | 8/2006 | Harding | G06F 11/3604 714/38.11 |
| 2006/0190923 | A1 * | 8/2006 | Jubran | G06F 8/20 717/104 |
| 2007/0226690 | A1 * | 9/2007 | Sandys | G06F 11/3604 717/124 |
| 2008/0244536 | A1 * | 10/2008 | Farchi | G06F 8/433 717/130 |
| 2009/0119648 | A1 * | 5/2009 | Chess | G06F 11/3608 717/131 |
| 2010/0333069 | A1 * | 12/2010 | Chandra | G06F 8/75 717/126 |

(Continued)

*Primary Examiner* — Insun Kang
(74) *Attorney, Agent, or Firm* — Cantor Colburn LLP; Noah Sharkan (57) ABSTRACT

Embodiments include methods, systems, and computer program products for using static analysis to issue complaints. Aspects include generating, using a processing unit, a first complaint during static analysis of program code, wherein the first complaint corresponds to a program error. Aspects also include generating, using the processing unit, a second complaint when the first complaint is not encountered during subsequent static analysis of the program code. Aspects further include outputting, using the processing unit, the second complaint to a non-transitory computer readable medium.

15 Claims, 10 Drawing Sheets

(56) References Cited

U.S. PATENT DOCUMENTS

| | | | | |
|---|---|---|---|---|
| 2011/0087892 A1* | 4/2011 | Haviv | ............... | G06F 11/3692 |
| | | | | 713/187 |
| 2011/0088016 A1* | 4/2011 | Ball | ............... | G06F 8/43 |
| | | | | 717/128 |
| 2011/0145650 A1* | 6/2011 | Krauss | ............... | G06F 11/3604 |
| | | | | 714/38.1 |
| 2011/0252394 A1* | 10/2011 | Sharma | ............... | G06F 11/3616 |
| | | | | 717/101 |
| 2013/0145215 A1* | 6/2013 | Pistoia | ............... | G06F 11/3604 |
| | | | | 714/38.1 |
| 2013/0152055 A1* | 6/2013 | Joshi | ............... | G06F 11/3604 |
| | | | | 717/131 |
| 2014/0115564 A1* | 4/2014 | Guarnieri | ............... | G06F 8/75 |
| | | | | 717/126 |
| 2014/0123110 A1* | 5/2014 | Wan | ............... | G06F 11/3672 |
| | | | | 717/124 |
| 2014/0282419 A1* | 9/2014 | Yoshida | ............... | G06F 11/3604 |
| | | | | 717/126 |
| 2014/0337819 A1* | 11/2014 | Fahndrich | ............... | G06F 11/3608 |
| | | | | 717/122 |
| 2015/0058826 A1* | 2/2015 | Hu | ............... | G06F 11/362 |
| | | | | 717/128 |
| 2017/0075787 A1* | 3/2017 | Muske | ............... | G06F 8/00 |
| 2017/0329694 A1* | 11/2017 | Yoon | ............... | G06F 11/3608 |
| 2018/0046564 A1* | 2/2018 | Muske | ............... | G06F 11/3604 |
| 2018/0114026 A1* | 4/2018 | Wang | ............... | G06F 21/577 |

\* cited by examiner

ISSUANCE OF STATIC ANALYSIS COMPLAINTS

BACKGROUND

The present invention relates to static analysis, and more specifically, to generating complaints during static analysis.

Software programs may contain implementation or design errors created by developers who write the underlying software code for the programs. Thus, during development, several rounds of writing, testing, and modification may be required before a high-quality software product can be released.

Static analysis is widely used during development to identify possible implementation or design errors. Static analysis is a method of computer program debugging that is done by examining the code without executing the program. The process provides an understanding of the code structure and can help to ensure that the code adheres to industry standards by issuing complaints whenever code is detected that corresponds to an implementation or design error.

However, many complaints issued by a typical static analysis tool are considered false positives, or are otherwise insignificant. For example, there are cases when a programmer would opt to include code that a static analysis tool would normally complain about, but would actually be considered bad practice to remove. Accordingly, there are multiple techniques by which a static analysis tool can be configured to ignore those particular types of complaints in specific parts of the program (i.e., not issue/suppress a complaint about that section of code in the future). For example, the use of comments to provide issue/suppress directives to a static analysis tool is widely used.

However, other challenges exist in contemporary static code analysis approaches. For example, existing static code analysis tools do not offer support for handling changes over time relating to the implementation or design errors and the corresponding complaints that may or may not be issued.

SUMMARY

According to an embodiment, a computer-implemented method for using static analysis to issue complaints includes generating, using a processing unit, a first complaint during static analysis of program code, wherein the first complaint corresponds to a program error. The method also includes generating, using the processing unit, a second complaint when the first complaint is not encountered during subsequent static analysis of the program code. The method further includes outputting, using the processing unit, the second complaint to a non-transitory computer readable medium.

According to another embodiment, a system using static analysis to issue complaints includes a non-transitory memory having computer readable instructions and one or more processors for executing the computer readable instructions. The computer readable instructions include generating a first complaint during static analysis of program code, wherein the first complaint corresponds to a program error. The computer readable instructions also include generating a second complaint when the first complaint is not encountered during subsequent static analysis of the program code. The computer readable instructions further include outputting the second complaint.

According to a further embodiment, a computer program product for using static analysis to issue complaints includes a non-transitory computer readable storage medium having program instructions embodied therewith. The program instructions executable by a processing unit to cause the processing unit to generate a first complaint during static analysis of program code, wherein the first complaint corresponds to a program error. The program instructions also cause the processing unit to opt to retain the program error in the program code. The program instructions also cause the processing unit to suppress the first complaint in response to the corresponding program error associated with the first complaint being retained in the program code. The program instructions also cause the processing unit to generate a second complaint when the first complaint is not encountered during subsequent static analysis of the program code and output the second complaint

BRIEF DESCRIPTION OF THE DRAWINGS

The forgoing and other features, and advantages of the invention are apparent from the following detailed description taken in conjunction with the accompanying drawings in which.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to creating a new complaint when an original type complaint is no longer observed and/or encountered. According to one or more embodiments, the new complaint can also be called an encounter complaint, or second complaint, and can be in the form of a message, notification, signal, or the like. According to one or more embodiments, for a specific section of code, a new complaint can be issued if a previous complaint that was formerly observed is no longer encountered and/or observed.

For example, according to or more embodiments, during execution a static analysis tool encounters hints that a complaint is expected at a particular location in the code. The static analysis tools can be provided the ability to receive these hints, often through comments embedded in the code. In one or more embodiments, the static analysis tool can suppress a particular type or types of complaints when such comments are encountered. One or more embodiments take this concept further. Specifically, one or more embodiments in addition to, or instead of, suppressing a complaint if one should occur on that code, generate a different type of complaint that can be issued if the static analysis tool would not normally issue the expected complaint about the given code.

Said another way, in accordance with one or more embodiments, a static analysis tool suppresses the complaints if the complaints should occur on a given code. Further, a different type of complaint is issued by the static analysis tool if the expected complaint does not occur on the given code.

Figure 1:
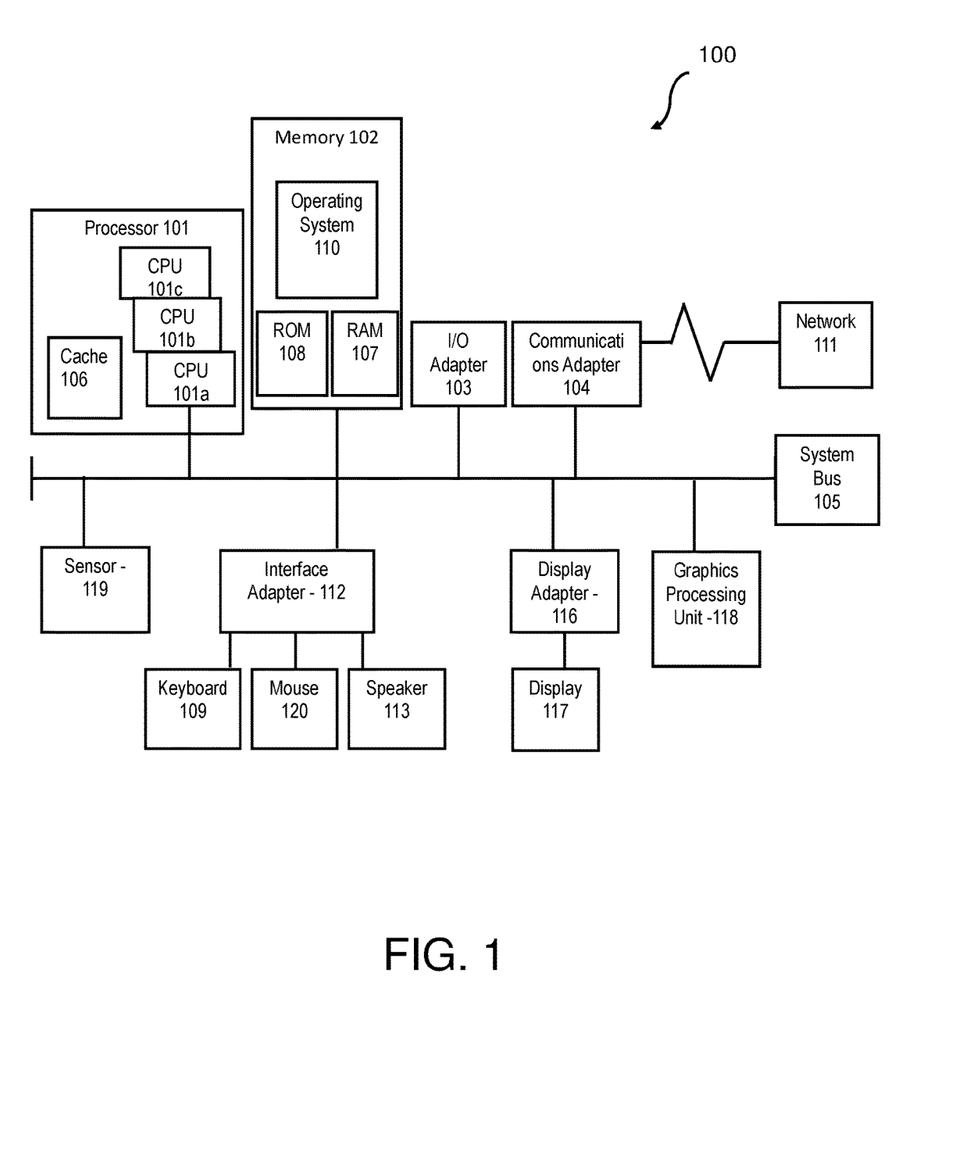
FIG. 1 illustrates a block diagram of a computer system for implementing some or all aspects of the system and method in accordance with one or more embodiments.

Turning now to FIG. 1, FIG. 1 illustrates a block diagram of a computer system 100 for implementing some or all aspects of the system and method in accordance with one or more embodiments. Particularly, FIG. 1 shows an electronic computing device 100, which may also be called a computer system 100, which includes a plurality of electronic computing device sub-components that is generally shown in accordance with one or more embodiments. Particularly, FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Communications adaptor 104 may operatively connect computer 100 to one or more networks 111. System bus 105 may also connect one or more user interfaces via interface adaptor 112. Interface adaptor 112 may connect a plurality of user interfaces to computer 100 including, for example, keyboard 109, mouse 120, speaker 113, etc. System bus 105 may also connect display adaptor 116 and display 117 to processor 101. Processor 101 may also be operatively connected to graphical processing unit 118.

Further, the computer 100 may also include a sensor 119 that is operatively connected to one or more of the other electronic sub-components of the computer 100 through the system bus 105. The sensor 119 can be an integrated or a standalone sensor that is separate from the computer 100 and may be communicatively connected using a wire or may communicate with the computer 100 using wireless transmissions.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101$a$-101$c$, an auxiliary processor among several other processors associated with the computer 100, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read-only memory (EPROM), flash memory, electronically erasable programmable read only memory (EEPROM), programmable read-only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 110. Operating system 110 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 120. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 110, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

According to one or more embodiments, any one of the electronic computing device sub-components of the computer 100 includes a circuit board connecting circuit elements that process data and can run program code. Further, the computer 100 can be used to not only write and run program code but can also execute static analysis of the code and described in the embodiments contained herein.

Figure 2A:
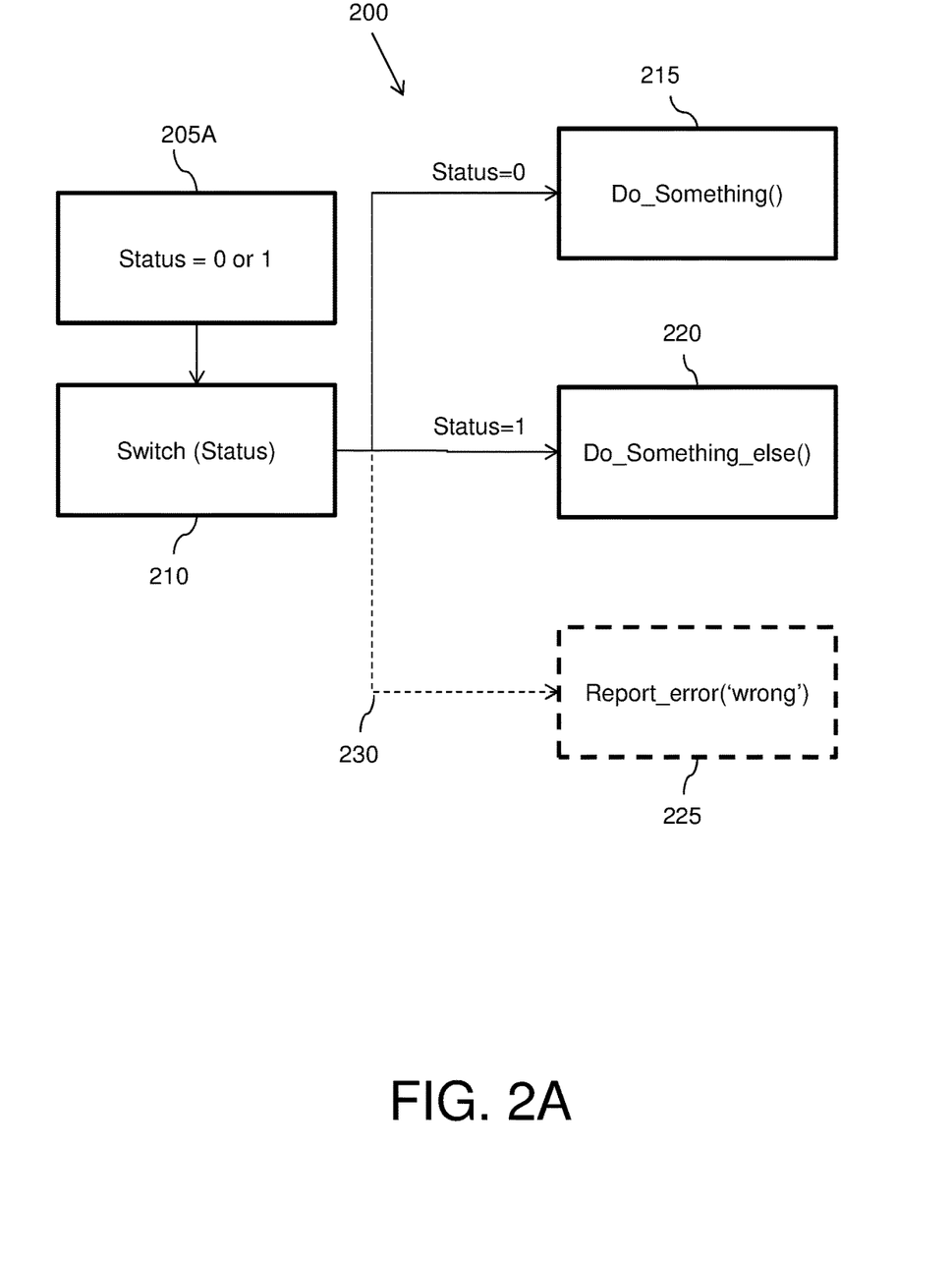
FIG. 2A illustrates an example of a program code structure of program code that contains a program error and is subject to static analysis in accordance with one or more embodiments.

FIG. 2A illustrates an example of a program code structure 200 of program code that contains a program error 230 and is subject to static analysis in accordance with one or more embodiments. As shown a status value 205A is defined as being either a zero or a one. The status value 205A is provided as an input to a switch function 210. The switch function 210 can switch between different cases depending on the status value 205 A being either zero or one. For example, as shown, when Status=0 the switch function 210 calls another function called a Do_Something function 215. Alternatively, when the Status=1 the switch function 210 can switch and call a different function called Do_Something_else function 220.

Further the program code structure can include another switch option 225. For example, as shown this function can be a Report_error function 225 that can output a 'wrong' value. However, as shown, this portion of the structure is shown in dotted lines to represent that it is inaccessible code under the current structure. Specifically, since the Status value 205A is defined as only being one of two options, it is not possible to select the Report_error function 225 and therefore this can be identified as a program error 230.

Figure 2B:
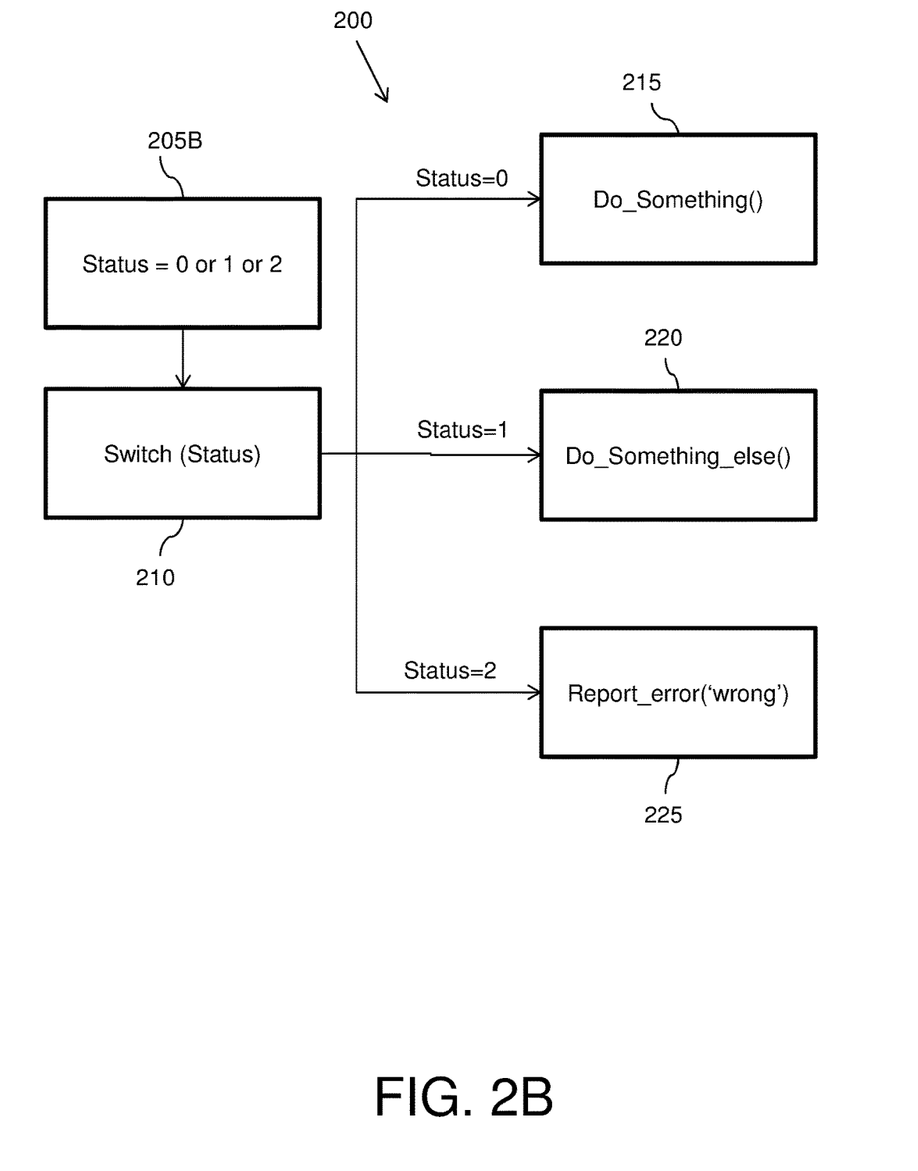
FIG. 2B illustrates an example of the program code structure of program code from FIG. 2A that is subject to static analysis without the program error in accordance with one or more embodiments.

FIG. 2B illustrates an example of the program code structure 200 of program code from FIG. 2A that is subject to static analysis without the program error 230 in accordance with one or more embodiments. This program code structure 200 can be adapted into this form over time by changing one or more functions or value definitions etc. For example, in FIG. 2B a change in the range of values that Status can achieve is shown and its effect on the remaining code structure is explained.

As shown a status value 205B is defined as being a zero, a one, or two. The status value 205B is provided as an input to a switch function 210. The switch function 210 can switch between different cases depending on the status value 205B being zero, one, or two. For example, as shown, when Status=0 the switch function 210 calls another function called a Do_Something function 215. Alternatively, when the Status=1 the switch function 210 can switch and call a different function called Do_Something_else function 220.

Further the program code structure can include another switch option 225. For example, as shown this function can be a Report_error function 225 that can output a 'wrong' value. Previously, this portion of the structure was shown in dotted lines to represent that it is inaccessible code under the structure of FIG. 2A. Specifically, since the Status value 205A was defined as only being one of two options, it was not possible to select the Report_error function 225 and therefore it was identified as a program error 230. In contrast, in FIG. 2B the Status value 205B can now be two. Accordingly, when the Status=2 the switch function 210 calls the report_error function 225 which can output a 'wrong' value as shown. Accordingly, this structure 200 of FIG. 2B has been changed over time such that the previous program error 230 is no longer encountered.

This change from identifying and encountering a program error 230 as shown in FIG. 2A and then not encountering the program error 230 later when the subsequent static analysis is performed as shown in FIG. 2B can be captured using complaint generation. Specifically, according to one or more embodiments, a method can be provided that generates a first complaint during static analysis of program code 200 as shown in FIG. 2A, where the first complaint corresponds to the program error 230. Further, the method can further generate a second complaint when the first complaint is not encountered during subsequent static analysis of the program code 200 as shown in FIG. 2B and the second complaint can be output.

According to one or more embodiments, the above structure and use can be represented in code as well. For example, consider the following simplified code that captures the above program code structure of FIG. 2A as an example:

```
status = function_returns_0_or_1();
switch(status)
{
case 0:
    do_something();
    break;
case 1:
    do_something_else();
    break;
default:
    report_error("wrong");
}
```

In this embodiment, the default case in the switch statement cannot be executed as shown in FIG. 2A, and the static analysis tool would report an "unused code" complaint and/or some kind of "case never occurs" complaint. However, many programmers would opt to leave in the default condition, in case function_returns_0 or_1( )is ever updated to return a different value as shown in FIG. 2B.

Figure 3A:
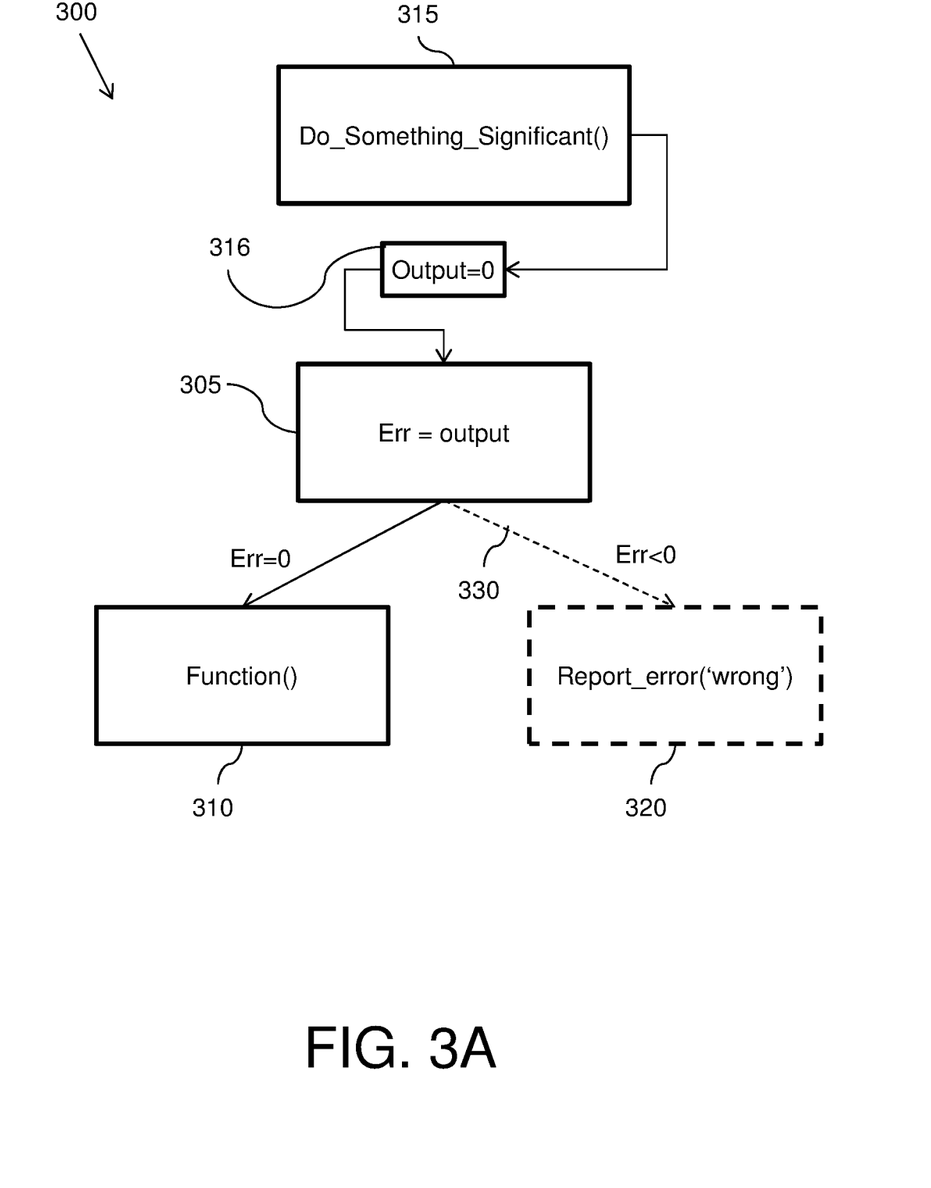
FIG. 3A illustrates an example of a program code structure of program code that contains a program error and is subject to static analysis in accordance with one or more embodiments.

FIG. 3A illustrates an example of a program code structure 300 of program code that contains a program error 330 and is subject to static analysis in accordance with one or more embodiments. A shown, a function 315 can be initially called that always outputs a value 316 of zero. Specifically, the Do_Something_Significant function 315 can be called that provided a consistent output value 316 of zero. This output value 316 is input to another function 305 that sets a Err value 305 to be whatever the value of the output value 316 that is provided happens to be. Accordingly, the Err value 305 is always set to zero in this program code structure 300. Further, the function 305 also selects another function depending on the value that the Err value is set too. Accordingly, when the Err=0 the function 305 calls function 310.

Further, the program code structure 300 provides for a case where the Err value is set to something other than zero. Specifically, as shown, the structure 300 provides a function call if the Err value is less than zero. Particularly, a Report_error function 320 can be called that outputs a 'wrong' value. However, because the function 315 always sets the output to zero, this branch and function 320 cannot be called and is, therefore, a program error 330.

Figure 3B:
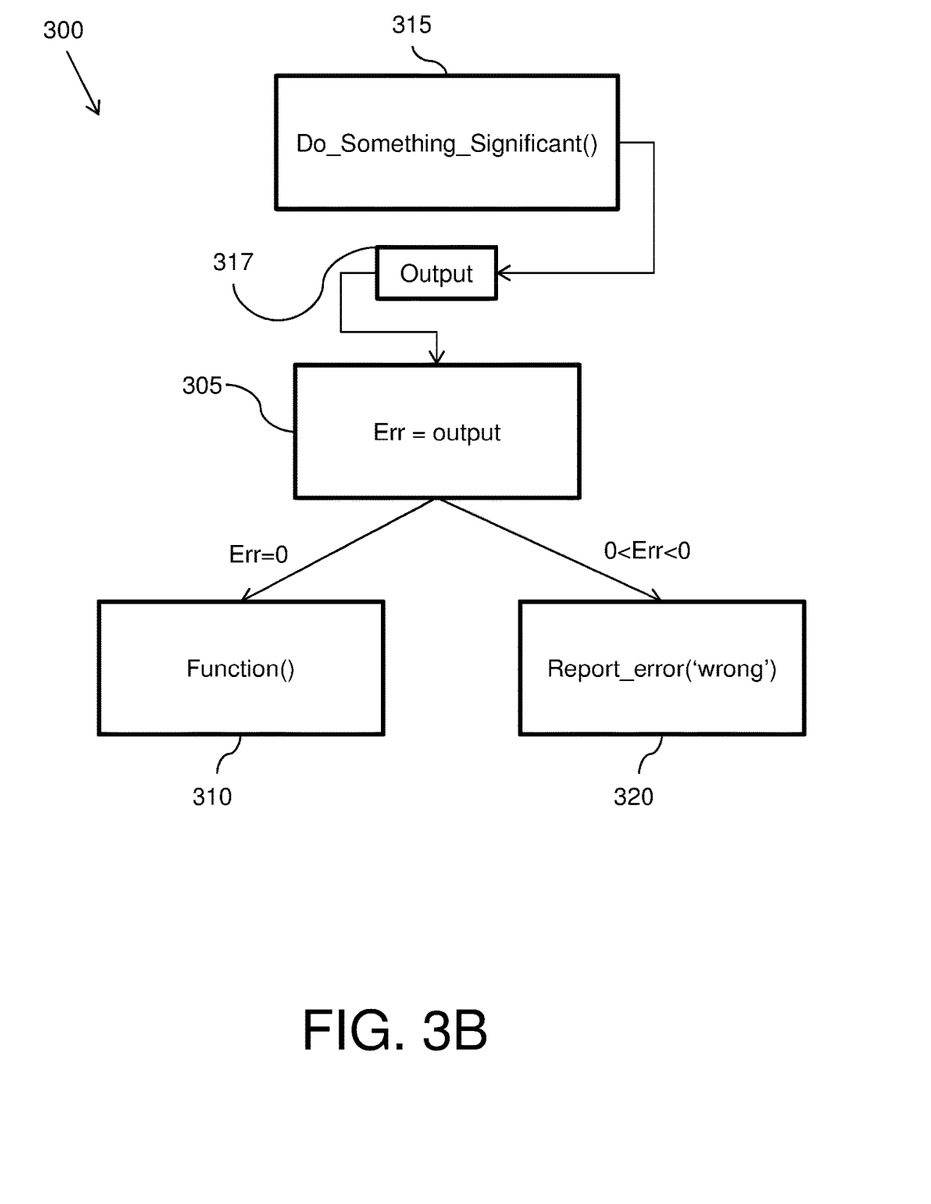
FIG. 3B illustrates an example of the program code structure of program code from FIG. 3A that is subject to static analysis without the program error in accordance with one or more embodiments.

FIG. 3B illustrates an example of the program code structure 300 of program code from FIG. 3A that is subject to static analysis without the program error 330 in accordance with one or more embodiments. In this embodiment, the Do_Something Significant function 315 can output a value 317 without any restriction. Accordingly, the function 305 sets the Err value to whatever the input-output value happens to be when received. Accordingly, when the Err=0 function 305 can call function 310. Further, when the Err value is either greater than zero or less than zero the function 305 can call the Report_error function 320. Accordingly, the program error 330 is no longer present in the program code structure 300.

This change from identifying and encountering a program error 330 as shown in FIG. 3A and then not encountering the program error 330 later when the subsequent static analysis is performed as shown in FIG. 3B can be captured using complaint generation. Specifically, according to one or more embodiments, a method can be provided that generates a first complaint during static analysis of program code 300 as shown in FIG. 3A, where the first complaint corresponds to the program error 330. Further, the method can further generate a second complaint when the first complaint is not encountered during subsequent static analysis of the program code 300 as shown in FIG. 3B and the second complaint can be output.

According to one or more embodiments, the above structure and use can be represented in code as well. For example, consider the following simplified code that captures the above program code structure of FIG. 3A as an example:

```
/* do_something_significant always returns 0 */
err = do_something_significant();
if (err < 0) {
    report_error("wrong");
}
```

In this embodiment, the current implementation of do_something_significant( ) only ever returns a zero as shown in FIG. 3A. A static analysis tool would report an "unused code" complaint and/or a "value never<0" complaint for the conditional. However, many programmers would opt to leave in the conditional, because if do_something_significant( )is ever modified to return a negative value as an error code as shown in FIG. 3B, the error-handling code would already be present to take care of it.

One or more embodiments provide techniques by which the complaint is not only suppressed if it is encountered, but also issues a different type of complaint if the expected complaint is not actually encountered.

According to one or more embodiments, there are a number of different ways that the first and second complaints can be generated and handled. By way of example, two different mechanisms by which this can be accomplished are provided herewith.

In one mechanisms embodiment, a structured comment can be placed on the offending line of code that corresponds to the program error. For example, in the first code example above, the comment would be on the line with the default case, and may look something like:

default:/*COMPLAIN_IF_EXECUTABLE*/

When this comment is encountered, the static analysis tool would suppress any "unused code" and/or "case never occurs" complaints that would normally be issued. However, if neither complaint would be issued, the tool would instead issue a "formerly unexecuted code is now executed" complaint.

According to another embodiment, a second mechanism can instead be employed when a database of static analysis complaints is employed. When reviewing the database, a developer would mark a complaint to be suppressed in future results, and would further mark it such that a different complaint is reported if the static analysis tool fails to report the suppressed complaint in future runs. When the results of further static analysis runs are added to the database and compared to the results of prior runs, these marks in the prior run would be processed, and the front-end tool would know to create a new complaint when an expected complaint is no longer observed.

Figure 4:
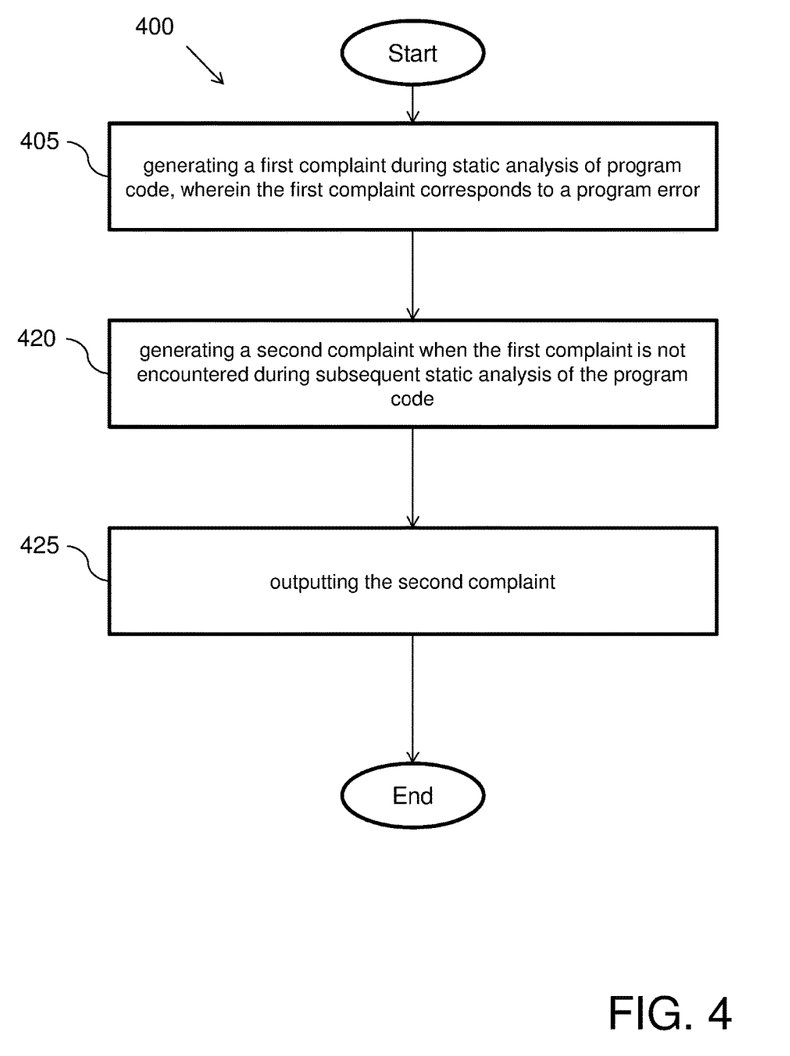
FIG. 4 illustrates a flowchart of a static analysis method in accordance with one or more embodiments.

FIG. 4 illustrates a flowchart of a static analysis method 400 in accordance with one or more embodiments. The method 400 includes generating a first complaint during static analysis of program code, wherein the first complaint corresponds to a program error (operation 405). The method 400 further includes generating a second complaint when the first complaint is not encountered during subsequent static analysis of the program code (operation 420). Further, the method 400 includes outputting the second complaint (operation 425).

Figure 5:
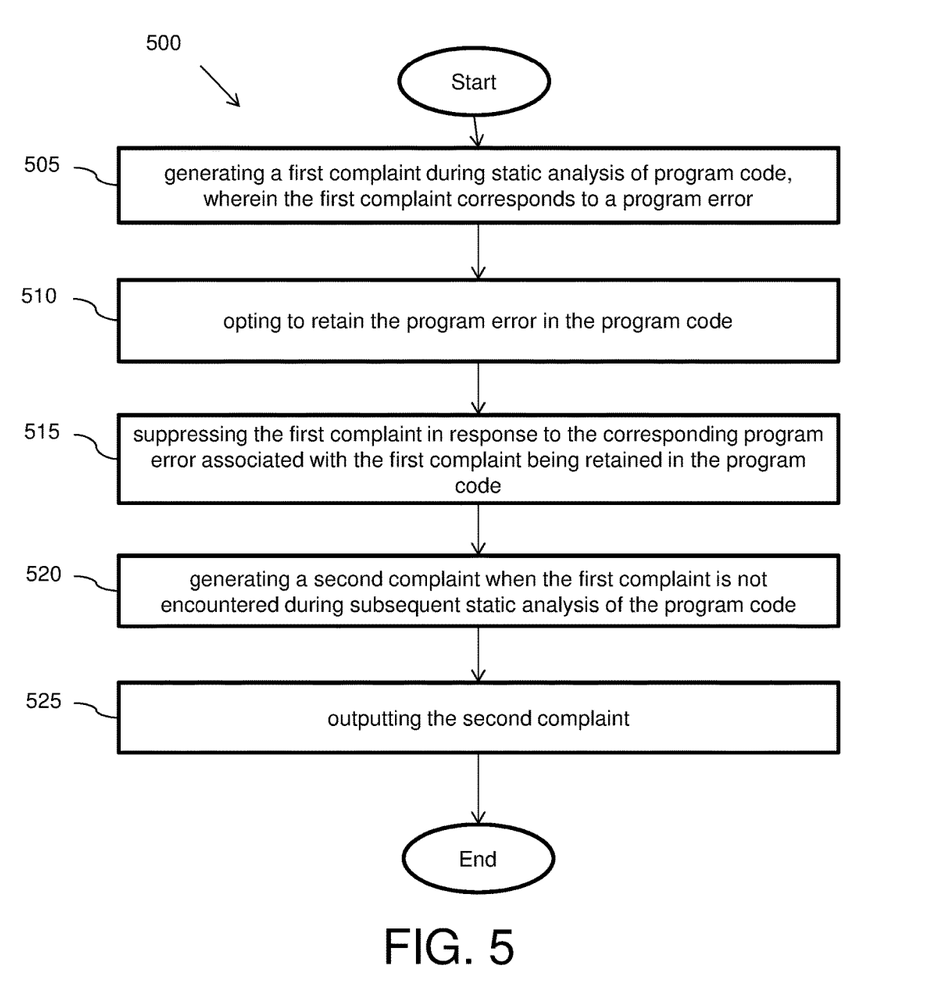
FIG. 5 illustrates a flowchart of a static analysis method in accordance with one or more embodiments.

FIG. 5 illustrates a flowchart of a static analysis method 500 in accordance with one or more embodiments. The method 500 includes generating a first complaint during static analysis of program code, wherein the first complaint corresponds to a program error (operation 505). The method 500 also includes opting to retain the program error in the program code (operation 510). Further, the method 500 includes suppressing the first complaint in response to the corresponding program error associated with the first complaint being retained in the program code (operation 515). The method 500 also includes generating a second complaint when the first complaint is not encountered during subsequent static analysis of the program code (operation 520) and outputting the second complaint (operation 525).

Figure 6:
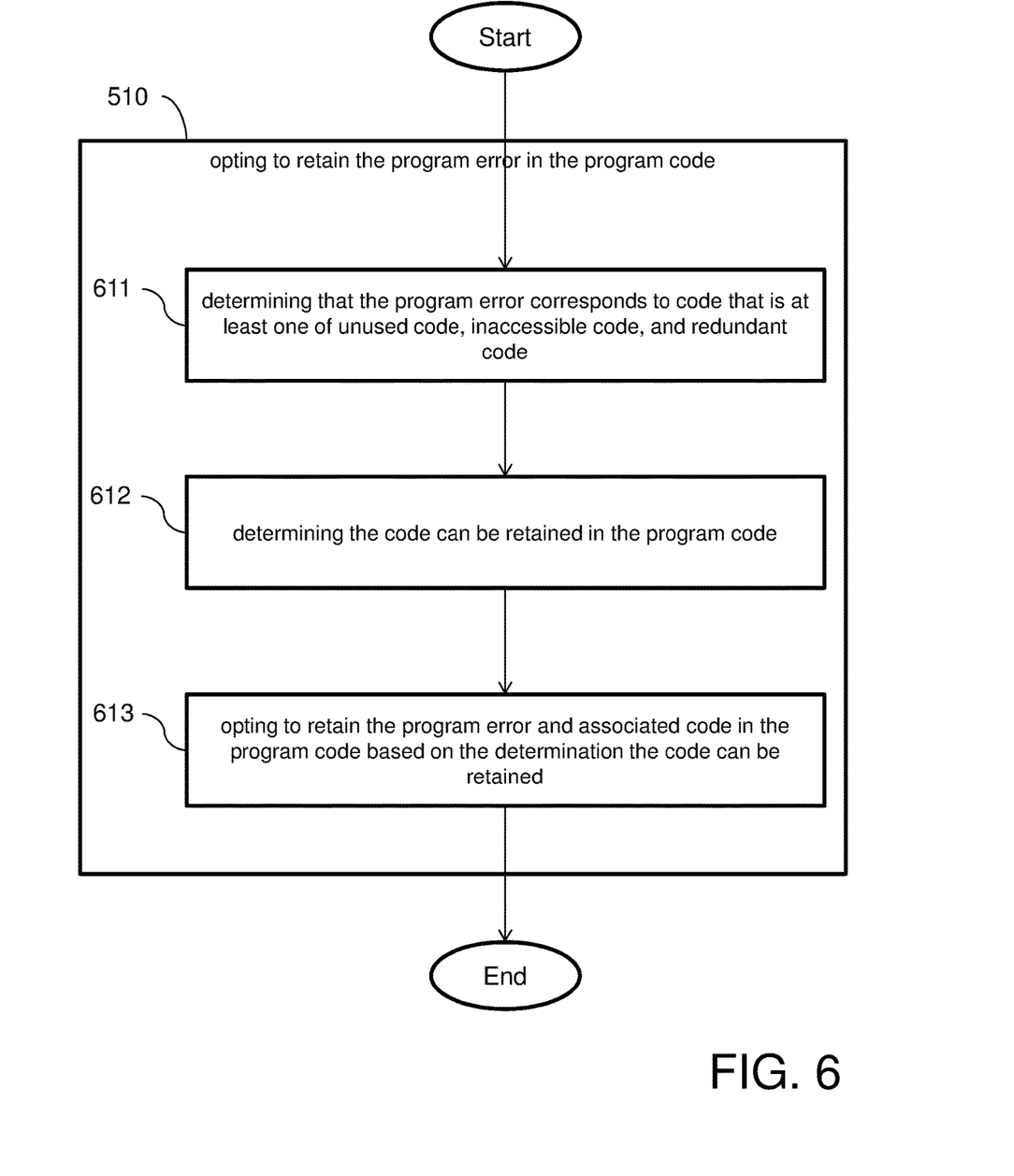
FIG. 6 illustrates a flow chart of additional operations that can be included in the opting to retain the program error in the program code operation of a static analysis method in accordance with one or more embodiments.

FIG. 6 illustrates a flow chart of additional operations that can be included in the opting to retain the program error in the program code operation (operation 510) of a static analysis method 500 in accordance with one or more embodiments. The method 500 can further include determining that the program error corresponds to code that is at least one of unused code, inaccessible code, and redundant code (operation 611). The method 500 can further include determining the code can be retained in the program code (operation 612). Further, the method 500 can further include opting to retain the program error and associated code in the program code based on the determination the code can be retained (operation 613).

Figure 7:
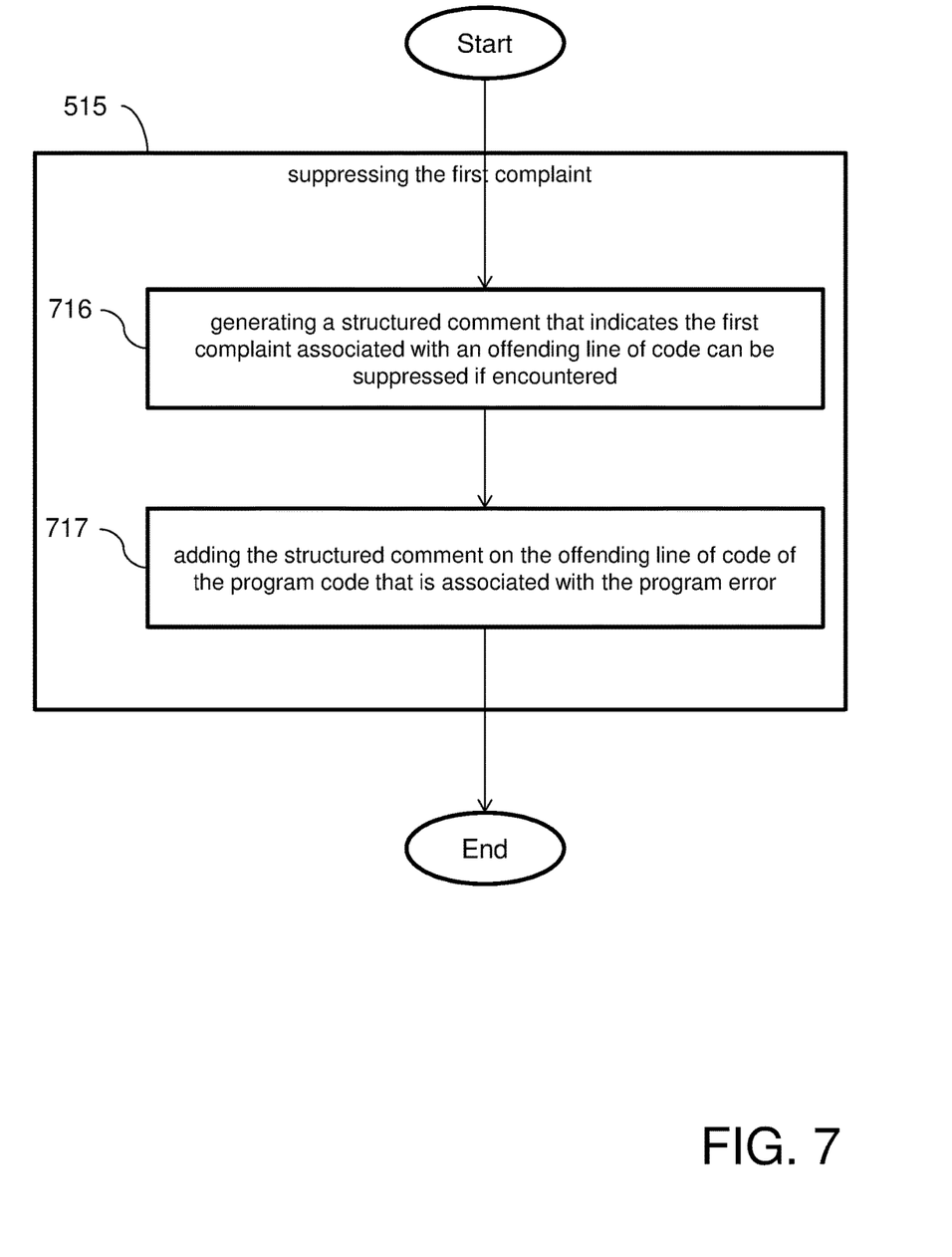
FIG. 7 illustrates a flow chart of additional operations that can be included in the suppressing the first complaint operation of a static analysis method in accordance with one or more embodiments.

FIG. 7 illustrates a flow chart of additional operations that can be included in the suppressing the first complaint operation (operation 515) of a static analysis method 500 in accordance with one or more embodiments. The method 500 can further include generating a structured comment that indicates the first complaint associated with an offending line of code can be suppressed if encountered (operation 716). Further, the method 500 can further include adding the structured comment on the offending line of code of the program code that is associated with the program error (operation 717).

Figure 8:
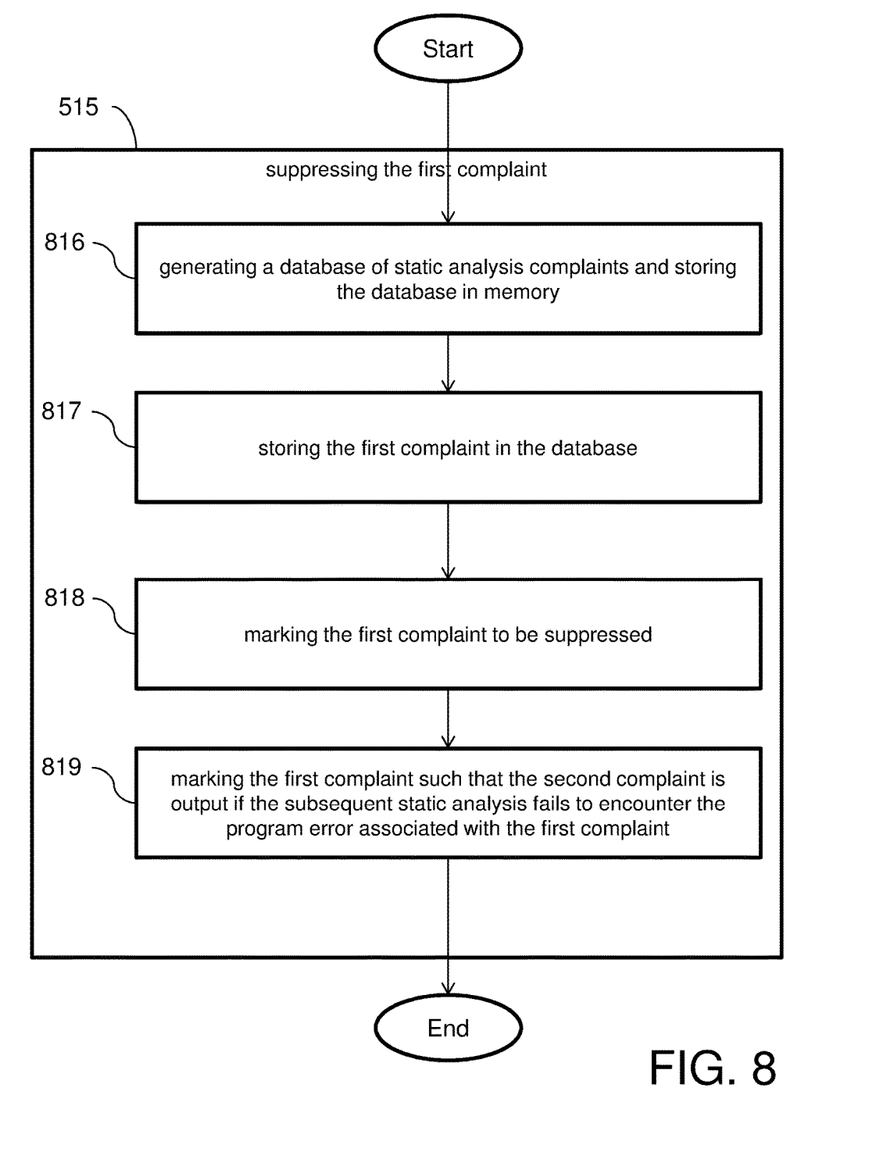
FIG. 8 illustrates a flow chart of additional operations that can be included in the suppressing the first complaint operation of a static analysis method in accordance with one or more embodiments.

FIG. 8 illustrates a flow chart of additional operations that can be included in the suppressing the first complaint operation (operation 515) of a static analysis method 500 in accordance with one or more embodiments. The method 500 can further include generating a database of static analysis complaints and storing the database in memory (operation 816). The method 500 can further include storing the first complaint in the database (operation 817). The method 500 can further include marking the first complaint to be suppressed (operation 818). The method 500 can further include marking the first complaint such that the second complaint is output if the subsequent static analysis fails to encounter the program error associated with the first complaint (operation 819).

According to another embodiment, a static analysis method can include outputting the first complaint. Further, outputting the first complaint can include determining the program error corresponds to code that is at least one of code attempting to access a position outside dimensions of a data array, code that uses a memory location and fails to release the memory location, and code that causes the program code to fail and outputting the first complaint based on the determination.

Further, according to another embodiment, suppressing the first complaint includes determining the first complaint and program code error are a false positive, and suppressing the first complaint based on the false positive determination.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as JAVA, SMALLTALK, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. in the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for using static analysis to issue complaints comprising:
   generating, using a processing unit, a first complaint during static analysis of program code, wherein the first complaint corresponds to a program error;
   generating, using the processing unit, a second complaint based at least in part on not encountering the first complaint during subsequent static analysis of the program code;
   outputting, using the processing unit, the second complaint to a non-transitory computer readable medium;
   opting to retain the program error in the program code; and
   suppressing the first complaint in response to the corresponding program error associated with the first complaint being retained in the program code, the suppressing the first complaint comprising:
      generating a database of static analysis complaints and storing the database in a memory;
      storing the first complaint in the database;
      marking the first complaint to be suppressed; and
      marking the first complaint such that the second complaint is output if the subsequent static analysis fails to encounter the program error associated with the first complaint.

2. The computer-implemented method of claim 1, wherein opting to retain the program error in the program code comprises:

determining that the program error corresponds to code that is at least one of unused code, inaccessible code, and redundant code;

determining that the code can be retained in the program code; and opting to retain the program error and associated code in the program code based on the determination that the code can be retained.

3. The computer-implemented method of claim 1, wherein suppressing the first complaint further comprises:

generating a structured comment that indicates the first complaint associated with an offending line of code can be suppressed if encountered; and adding the structured comment on the offending line of code of the program code that is associated with the program error.

4. The computer-implemented method of claim 1, further comprising:

outputting the first complaint.

5. The computer-implemented method of claim 4, wherein outputting the first complaint comprises:

determining that the program error corresponds to code that is at least one of code attempting to access a position outside dimensions of a data array, code that uses a memory location and fails to release the memory location, and code that causes the program code to fail; and outputting the first complaint based on the determination.

6. The computer-implemented method of claim l, wherein suppressing the first complaint further comprises:

determining that the first complaint and program code error are a false positive; and suppressing the first complaint based on the false positive determination.

7. A system for using static analysis to issue complaints, the system comprising:

a non-transitory memory having computer readable instructions; and one or more processors for executing the computer readable instructions, the computer readable instructions comprising:

generating a first complaint during static analysis of program code, wherein the first complaint corresponds to a program error;

generating a second complaint based at least in part on not encountering the first complaint during subsequent static analysis of the program code;

outputting the second complaint;

opting to retain the program error in the program code; and suppressing the first complaint in response to the corresponding program error associated with the first complaint being retained in the program code, the suppressing the first complaint comprising:

generating a database of static analysis complaints and storing the database in a memory;

storing the first complaint in the database;

marking the first complaint to be suppressed; and marking the first complaint such that the second complaint is output if the subsequent static analysis fails to encounter the program error associated with the first complaint.

8. The system of claim 7, wherein opting to retain the program error in the program code comprises:

determining that the program error corresponds to code that is at least one of unused code, inaccessible code, and redundant code;

determining that the code can be retained in the program code; and opting to retain the program error and associated code in the program code based on the determination that the code can be retained.

9. The system of claim 7, wherein suppressing the first complaint comprises:

generating a structured comment that indicates the first complaint associated with an offending line of code can be suppressed if encountered; and adding the structured comment on the offending line of code of the program code that is associated with the program error.

10. The system of claim 7, further comprising:

outputting the first complaint.

11. The system of claim 10, wherein outputting the first complaint comprises:

determining that the program error corresponds to code that is at least one of code attempting to access a position outside dimensions of a data array, code that uses a memory location and fails to release the memory location, and code that causes the program code to fail; and outputting the first complaint based on the determination.

12. The system of claim 7, wherein suppressing the first complaint comprises:

determining that the first complaint and program code error are a false positive; and suppressing the first complaint based on the false positive determination.

13. A computer program product for using static analysis to issue complaints, the computer program product comprising a non-transitory computer readable storage medium having program instructions embodied therewith, the program instructions executable by a processing unit to cause the processing unit to:

generate a first complaint during static analysis of program code, wherein the first complaint corresponds to a program error;

opt to retain the program error in the program code;

generate a second complaint based at least in part on not encountering the first complaint during subsequent static analysis of the program code;

output the second complaint; and suppress the first complaint in response to the corresponding program error associated with the first complaint being retained in the program code, the suppressing the first complaint comprising:

generating a database of static analysis complaints and storing the database in a memory;

storing the first complaint in the database;

marking the first complaint to be suppressed; and marking the first complaint such that the second complaint is output if the subsequent static analysis fails to encounter the program error associated with the first complaint.

14. The computer program product of claim 13, wherein opting to retain the program error in the program code comprises program instructions executable by the processing unit to cause the processing unit to:

determine that the program error corresponds to code that is at least one of unused code, inaccessible code, and redundant code;

determine that the code can be retained in the program code; and opt to retain the program error and associated code in the program code based on the determination that the code can be retained.

15. The computer program product of claim 13, wherein suppressing the first complaint further comprises program instructions executable by the processing unit to cause the processing unit to:
generate a structured comment that indicates the first complaint associated with an offending line of code can be suppressed if encountered; and
add the structured comment on the offending line of code of the program code that is associated with the program error.

\* \* \* \* \*